(12) United States Patent
Hicks, III et al.

(10) Patent No.: US 8,001,574 B2
(45) Date of Patent: *Aug. 16, 2011

(54) METHODS, SYSTEMS, AND PRODUCTS FOR MEDIA ON-DEMAND

(75) Inventors: John Alson Hicks, III, Roswell, GA (US); Randy Scott Zimler, Gainesville, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/708,600

(22) Filed: Feb. 19, 2010

(65) Prior Publication Data

US 2010/0146539 A1  Jun. 10, 2010

Related U.S. Application Data

(63) Continuation of application No. 09/749,826, filed on Dec. 28, 2000, now Pat. No. 7,698,723.

(51) Int. Cl.
*H04N 7/18* (2006.01)
*H04N 7/16* (2011.01)
(52) U.S. Cl. .............. 725/82; 725/78; 725/141
(58) Field of Classification Search .............. 725/78, 725/79, 82, 146
See application file for complete search history.

(56) References Cited

U.S. PATENT DOCUMENTS

| | | | |
|---|---|---|---|
| 4,949,187 A | 8/1990 | Cohen | |
| 5,262,875 A | 11/1993 | Mincer et al. | |
| 5,481,609 A | 1/1996 | Cohen et al. | |
| 5,574,964 A | 11/1996 | Hamlin | |
| 5,781,734 A | 7/1998 | Ohno et al. | |
| 5,790,176 A | 8/1998 | Craig | |
| 5,808,659 A * | 9/1998 | Coutinho et al. | 725/141 |
| 5,883,677 A | 3/1999 | Hofmann | |
| 6,005,861 A | 12/1999 | Humpleman | |
| 6,011,548 A | 1/2000 | Thacker | |
| 6,081,533 A | 6/2000 | Laubach et al. | |
| 6,141,488 A | 10/2000 | Knudson et al. | |
| 6,202,211 B1 | 3/2001 | Williams, Jr. | |
| 6,233,389 B1 | 5/2001 | Barton et al. | |
| 6,317,884 B1 | 11/2001 | Eames et al. | |
| 6,487,390 B1 | 11/2002 | Virine et al. | |
| 6,526,580 B2 | 2/2003 | Shimomura et al. | |
| 6,526,581 B1 | 2/2003 | Edson | |
| 6,611,537 B1 | 8/2003 | Edens et al. | |
| 6,628,891 B1 | 9/2003 | Vantalon et al. | |
| 6,633,547 B1 | 10/2003 | Akatsu et al. | |
| 6,637,031 B1 | 10/2003 | Chou | |
| 6,678,740 B1 | 1/2004 | Rakib et al. | |
| 6,732,366 B1 | 5/2004 | Russo | |
| 6,754,347 B1 | 6/2004 | Hamada | |
| 6,769,127 B1 | 7/2004 | Bonomi et al. | |
| 6,774,926 B1 | 8/2004 | Ellis et al. | |
| 6,839,902 B2 | 1/2005 | Hirota | |

(Continued)

*Primary Examiner* — William Trost, IV
*Assistant Examiner* — Chris Parry
(74) *Attorney, Agent, or Firm* — Scott P. Zimmerman PLLC

(57) ABSTRACT

Methods, systems, and products describe a video overlay processor connected to a system data bus and to a media bus. The video overlay processor superimposes a first audio-visual signal over a second audio-visual signal to produce a superimposed signal and sends the superimposed signal to the system data bus. A network bus connects to the system data bus and receives the superimposed signal. A data switch connects to the network bus, receives the superimposed signal, and sends the superimposed signal to one or more switch ports of the data switch.

20 Claims, 6 Drawing Sheets

U.S. PATENT DOCUMENTS

| | | |
|---|---|---|
| 6,862,741 B1 | 3/2005 | Grooters |
| 6,889,385 B1 * | 5/2005 | Rakib et al. .................. 725/119 |
| 7,200,683 B1 | 4/2007 | Wang et al. |
| 7,290,274 B1 | 10/2007 | Banker et al. |
| 2001/0011284 A1 | 8/2001 | Humpleman et al. |
| 2002/0009149 A1 | 1/2002 | Rodriguez et al. |
| 2002/0016971 A1 | 2/2002 | Berezowski et al. |
| 2002/0059616 A1 | 5/2002 | Vasilevsky et al. |
| 2002/0118954 A1 | 8/2002 | Barton et al. |
| 2002/0152311 A1 | 10/2002 | Veltman et al. |
| 2003/0192053 A1 | 10/2003 | Sheppard et al. |
| 2004/0117831 A1 | 6/2004 | Ellis et al. |
| 2004/0172658 A1 | 9/2004 | Rakib et al. |
| 2004/0175120 A1 | 9/2004 | Arsenault et al. |
| 2005/0273827 A1 | 12/2005 | Javed et al. |
| 2008/0184306 A1 | 7/2008 | Ellis et al. |

* cited by examiner

| 505 | 510 | 515 | 520 | 525 | 530 |
|---|---|---|---|---|---|
| MOVIE A | AUDIO-VIDEO | PLAY COST X | PLAY INDICATOR | PURCHASE COST X | PURCHASE INDICATOR |
| MOVIE B | AUDIO-VIDEO | PLAY COST Y | PLAY INDICATOR | PURCHASE COST Y | PURCHASE INDICATOR |
| SONG A | AUDIO | PLAY COST Z | PLAY INDICATOR | PURCHASE COST Z | PURCHASE INDICATOR |
| ALBUM A | AUDIO | PLAY COST Y | PLAY INDICATOR | PURCHASE COST Y | PURCHASE INDICATOR |

METHODS, SYSTEMS, AND PRODUCTS FOR MEDIA ON-DEMAND

CROSS-REFERENCE TO RELATED APPLICATIONS

This application is a continuation of U.S. application Ser. No. 09/749,826, filed Dec. 28, 2000, and now issued as U.S. Pat. No. 7,698,723.

FIELD OF THE INVENTION

The present invention relates to entertainment systems. More particularly, the present invention relates to systems and methods for multimedia on demand services.

BACKGROUND OF THE INVENTION

Consumers' homes typically include separate physical networks to support the distribution of video, audio, telephony, and data. For example, coaxial cable (such as quad-shielded RG6 coax), is often installed in homes for the distribution of audio/video (e.g., cable television ("CATV"), satellite broadcast television, local broadcast television) signals, while speaker wire is installed for the distribution of audio signals. Conventional home phone lines carry telephony and data. For example, the Home Phoneline Networking Alliance (HPNA) 2.0 specification supports networking speeds of 10 megabits per second (Mb/S). Twisted pair wiring, such as Category of Performance 5 ("CAT 5"), CAT 5e, CAT 6, or CAT 7, can be installed to support telephony networking and broadband data networking. CAT 5 cabling can support applications requiring a carrier frequency of up to 100 megahertz ("MHz"), and CAT 5e cabling can support signaling rates of up to 200 MHz over distances of up to 100 meters. Proposed cabling standards (proposed as of July, 2000) CAT 6 and CAT 7 are intended to support signaling rates of up to 250 MHz and 600 MHz respectively. Broadband data networking can also be supported by optical fiber cabling, such as Optical Carrier 3 ("OC-3") or better. OC-3 fiber cabling can support data transmission rates of up to 155.52 Mb/S.

To support delivery of integrated services (e.g., Web-enhanced TV) over these separate physical networks, known digital set top boxes ("STBs") typically have a plurality of physical interfaces for connection to the separate networks, e.g., a coax network interface for delivery of audio-video, a twisted pair network interface for broadband data networking, and other types of networks. In addition to having separate physical networks to handle video distribution, audio distribution, telephony networking, and broadband data networking, consumers often must learn to use different user interfaces for accessing and using video, audio, telephony and broadband data networking applications and services.

In the direct digital broadcast satellite TV business and in the digital cable TV business, service providers have started to introduce enhanced digital STBs that are Web-enabled and include computer hard drives for supporting the recording, storage, and playback of broadcast content. In addition, some enhanced digital STBs include two tuners so that a consumer can be watching one program while recording another program. The enhanced digital STBs can provide for pay-per-view movie delivery, but such services typically require the consumer to select a pay-per-view that is pre-scheduled for a particular time. For example, the consumer may have the choice of watching the pay-per-view movie at 8:00 p.m. or at 9:00 p.m. If the consumer, for example, wanted to watch the pay-per-view movie beginning at 7:00 p.m., she nevertheless would have to wait until 8:00 p.m. to begin viewing the pay-per-view movie.

The enhanced digital STBs are usually more expensive than a basic digital STB. Service providers have estimated that most households will be unlikely to purchase more than one of the enhanced digital STBs because of the significantly higher costs associated with the enhanced digital STBs (e.g., including Web-enablement, a hard drive, a second tuner). Although many consumers will have multiple digital STBs in their homes, it is likely that only one digital STB per home will be an enhanced digital STB. Therefore, consumers will only have access to enhanced services—such as video/audio on demand, interactive TV, Web surfing, e-mail, electronic shopping and recording/storing/playback of broadcast programs—when they are using their enhanced digital STB.

In view of the foregoing, it can be appreciated that a substantial need exists for systems and methods that can advantageously provide for multimedia on demand services.

SUMMARY OF THE INVENTION

Embodiments of the present invention relate to multimedia-on-demand services that can be provided by automatic downloading of selections of multimedia content items to a mass storage device. A user can select usage (e.g., playing, purchasing) of the locally-stored multimedia content items, and that usage can be reported to the multimedia-on-demand service provider. The locally-stored selections of multimedia content items can be automatically updated with downloads of new content items and removal of old content items.

In an embodiment, a system can include a mass storage device, a processor and a memory. The mass storage device can receive and store a multimedia content item, and the memory can store a multimedia-on-demand data table and multimedia-on-demand instructions. The multimedia-on-demand data table can include a multimedia content identifier field to store a multimedia content identifier, where the multimedia content identifier corresponds to a multimedia content item stored on the mass storage device. The multimedia-on-demand data table can include a multimedia content usage indicator field to store a multimedia content usage indicator, where the multimedia content usage indicator corresponds to the multimedia content item stored on the mass storage device. The multimedia-on-demand instruction can be executed by the processor and can include instructions to automatically receive the multimedia content item and send a multimedia-on-demand usage message, where the multimedia-on-demand usage message is based at least in part on the multimedia content usage indicator.

A method for providing multimedia-on-demand, in an embodiment, can include automatically sending a plurality of multimedia content items and a plurality of multimedia content item storage identifiers. The automatic sending of multimedia content items can be based at least in part on a subscriber profile, and each multimedia content item of the plurality of multimedia content items can correspond to a multimedia content item storage identifier of the plurality of multimedia content item storage identifiers. Subsequently, a multimedia content usage report can be received. The multimedia content usage report can include a multimedia content item usage indicator, where the multimedia content item usage indicator corresponds to a multimedia content item of the plurality of multimedia content items.

BRIEF DESCRIPTION OF THE DRAWINGS

FIG. 5 shows a data table in accordance with an embodiment of the present invention.

DETAILED DESCRIPTION OF THE INVENTION

Overview

Figure 1:
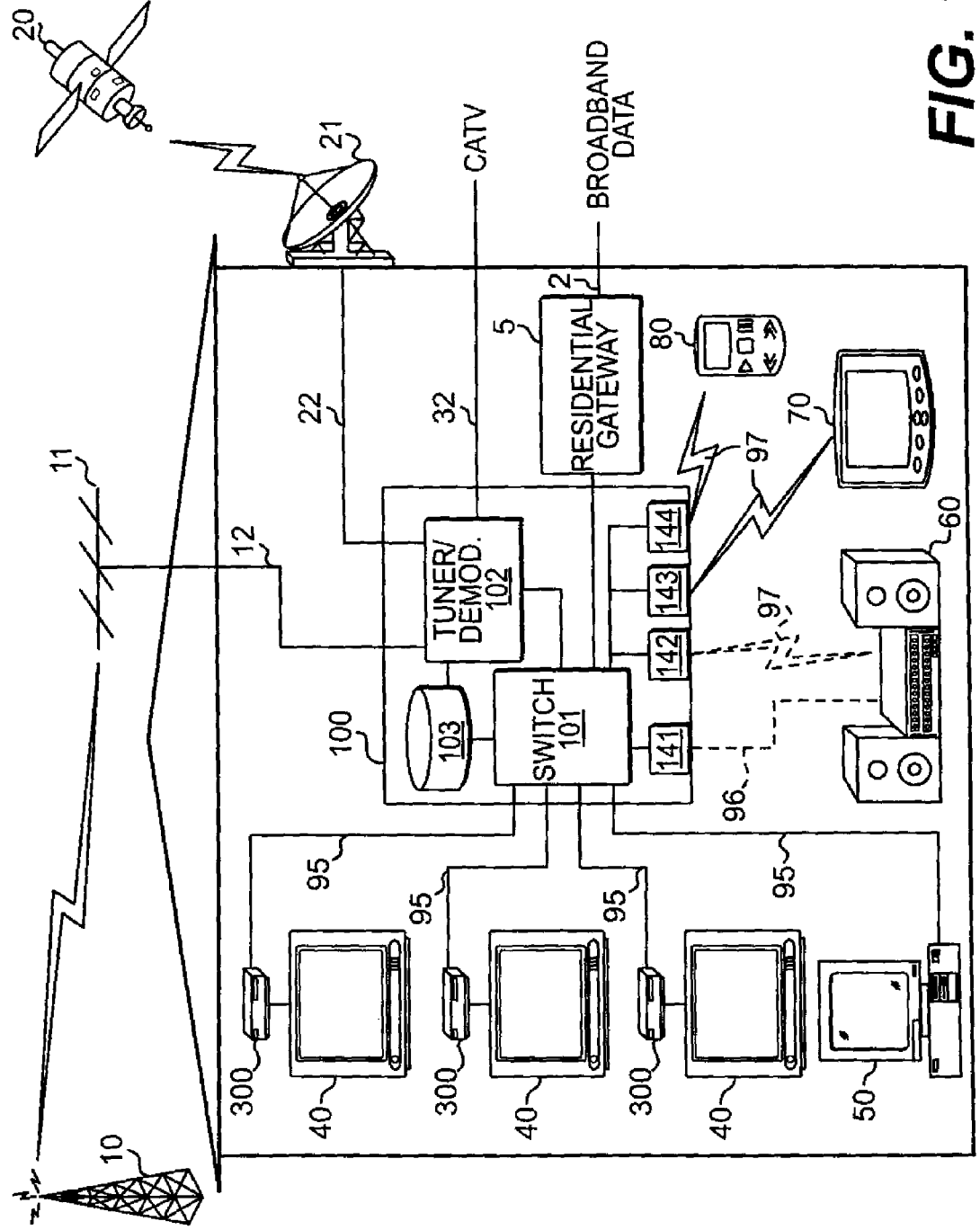
FIG. 1 is a schematic diagram of a preferred embodiment of the present invention.

According to the preferred embodiment of the present invention, a comprehensive digital residential entertainment system can provide access to multimedia content over an in-home broadband data network coupled to a variety of information appliances. A primary broadband data network is implemented over twisted pair (Category 5 or better) wiring in conjunction with Ethernet switch technology operating, in an embodiment, at a minimum of 100 Mbps. In general, twisted pair wiring is easier and cheaper to install than the coaxial wiring that is typically installed in homes to distribute video content. When used with Ethernet switch technology, twisted pair wiring is capable of supporting the distribution of broadcast quality entertainment video, such as direct digital broadcast satellite TV or digital cable TV, as well as, simultaneously supporting a wide range of multimedia applications and services.

Within the digital residential entertainment system, the primary broadband data network can be supplemented and extended by the addition of plug-in modules for other lower bandwidth data networking technologies, such as Home Phoneline Networking Alliance (HomePNA) Version 2.0, HomeRF Shared Wireless Access Protocol (Home RF SWAP), IEEE 802.11, Bluetooth, and other similar technologies. For example, HomePNA Version 2.0 allows for the multiplexing of 10 Mbps of data over existing phone wiring in the home without interfering with analog telephony services operating over the same telephone wiring. HomeRF, IEEE 802.11 and Bluetooth are wireless data, or voice/data, technologies. Within the digital residential entertainment system, HomePNA, HomeRF, IEEE 802.11 and Bluetooth can principally be used for transmitting lower bandwidth multimedia content, such as audio content, as opposed to entertainment quality audio-video transmitted over the primary broadband data network. As newer technology emerges that improves the performance characteristics of HomePNA and "wireless" technology, entertainment quality audio-video can be supported over what is defined today as lower bandwidth technologies.

In the preferred embodiment of the present invention, the digital residential entertainment system is based on a client/server architecture. A core element of the system is a broadband multimedia gateway (BMG) that can operate both as a multimedia gateway and content server within a client/server architecture. It contains an Ethernet switch that, in a typical embodiment, is capable of data communications of at least 100 Mbps per switch port. The BMG can receive video, audio and other forms of multimedia content from a variety of broadcasts (e.g., direct digital broadcast satellite TV, digital cable TV, terrestrial broadcast analog and/or digital TV), Intranet, and Internet sources. As used to describe embodiments of the present invention, the term "multimedia" encompasses video, audio, audio-video, text, graphics, facsimile, data, animation, and combinations thereof. The BMG can deliver multimedia content to a wide range of information appliances, such as digital televisions, computers, sound systems, electronic book displays, and graphical data tablets.

A digital residential entertainment system can include a BMG that has multiple tuner/demodulators which receive broadcast multimedia content and send the received multimedia content to the Ethernet switch of the BMG. For example, in an embodiment having multiple tuner/demodulators, each tuner/demodulator can be coupled to a respective switch port of the Ethernet switch. In another embodiment, the multiple tuner/demodulators have a shared communication link to a switch port of the Ethernet switch. Upon receiving multimedia content, the BMG can transmit the multimedia content through the Ethernet switch over the twisted pair data network to an information appliance (e.g., a thin-client digital set-top box, an audio system, a wireless MP3 player, or a wireless electronic device), store the multimedia content for future access, or transmit and store coincidentally (e.g., simultaneously). The BMG includes a mass storage device (e.g., a computer hard drive) that can store multimedia content from broadcast sources, an Intranet or the Internet.

In an embodiment, multimedia content can be stored in an encrypted format on the mass storage device. Thin-client information appliances, such as digital STBs, can include decoding and/or deciphering capabilities. Encryption of multimedia content can ensure that proprietary and/or copyrighted material is protected as it is transmitted across the residential broadband data network. Conditional access systems ("CAS") using smartcard technology, such as those manufactured by NagraCard S.A. of Cheseaux, Switzerland and NDS Group PLC of the United Kingdom, can be integrated in the entertainment system.

The BMG can manage multiple demodulators/tuners to allow recording one or more broadcast programs while watching another broadcast program. A program that is being watched can also be recorded to provide a viewer of the program with the ability to control the playback of the program (e.g., the ability to pause, rewind, and so forth). Multimedia content that is stored on the BMG can be accessed from any of the information appliances on the broadband home network.

In an embodiment, the BMG can include a Web-server to support a structured, Web browser-based user interface on each information appliance coupled to the BMG, such as digital STBs, audio systems, wireless MP3 players and wireless electronic books. For example, an infrared remote control and/or an optional wireless keyboard can communicate with a digital STB to interact with the Web browser-based graphical user interface that is presented on an information appliance such as a TV screen. The Web browser-based graphical user interface may be used to access broadcast and on-demand video and audio content and multimedia applications and services. Because the enhanced functionality resides in the central BMG as opposed to peripheral thick-client digital STBs, a broad range of functionality, including record/store/playback of broadcast programs, video/audio on demand, interactive TV, Web surfing, e-mail and electronic shopping, is accessible from every thin-client digital STB in the home.

For example, to view broadcast video content, a consumer can use an infrared remote control to select the content that he or she wants to view by utilizing a broadcast program guide, a search function, entering a channel number, and so on. After the consumer makes a selection, the thin-client digital STB communicates with the BMG requesting that the digital multimedia content be delivered to the digital STB. When the consumer selects playing of a broadcast satellite television channel, for example, the BMG can tune a demodulator/tuner to the selected broadcast channel and begin streaming the selected MPEG video stream through the Ethernet switch and over the twisted pair wiring to the digital STB where the video steam is decoded and displayed on the TV.

Service providers will be able to download multimedia content, such as movies, to the mass storage device of the BMG. The downloading can be accomplished using a broadband data service to the home, such as Asymmetric Digital Subscriber Line ("ADSL"), or via a satellite direct multicast/broadcast service. In a movies-on-demand service, when a consumer wants to watch a movie, they would use their infrared remote control to access a Web page on the BMG Web server to determine what movies are currently stored on the BMG. After the consumer selects a movie for viewing, the BMG would begin streaming the selected movie out to the thin-client digital STB/TV for viewing. While viewing a movie-on-demand, a consumer would have playback control, such as play, pause, stop, rewind and fast forward. The consumer could also opt to purchase a personal copy of the movie. The copy could be stored on the BMG, or output to separate mass storage medium (e.g., written to a Digital Versatile Disc). Audio content, such as an albums-on-demand service, could be implemented in a similar manner to allow playback and purchasing of audio content.

The preferred embodiment of the digital residential entertainment system is to couple the BMG to a residential gateway, where the residential gateway is coupled to an always-on broadband data service, such as ADSL or a fiber optic service. The BMG can be installed in homes without a residential gateway and/or a broadband data service. When the BMG is installed in homes without a broadband data service, the BMG can be coupled to a voiceband analog modem (e.g., a V.90 modem) coupled to an analog telephone line. The dial-up voiceband analog modem may be used to support maintenance, administration and billing applications (e.g., billing for movies-on-demand, music-on-demand).

As consumer data services offering significantly higher bandwidth to the home become available, such as fiber optical networks extending into the home, it will be possible to install a BMG, or a system with comparable functionality, outside of the home in a network-based platform.

Embodiments of the present invention can advantageously provide:

1. A common physical network in the home that supports the distribution of broadcast video, the distribution of audio, telephony networking, and broadband data networking, as opposed to using separate networks;

2. Less expensively installed twisted pair wiring can be installed for the distribution of broadcast quality entertainment video content as compared to a discrete coaxial cable system for the distribution of broadcast quality entertainment video content;

3. A relatively consistent, easy-to-use, Web-browser-based user interface can provide a user access to broadcast and on-demand video and audio content, as well as multimedia applications and services, on a range of information appliances;

4. Consumer access to many enhanced services—such as video/audio on demand, interactive TV, Web surfing, e-mail, electronic shopping and recording/storing/playback of broadcast programs—from each thin-client digital STB/TV in the home;

5. Quality of Service (QoS) concerns associated with delivering multimedia content via an Ethernet Internet Protocol (IP) can be addressed because each information appliance, such as a thin-client digital STB, is connected to a respective port on an Ethernet switch that is operating at a speed of 100 Mbps or higher. In an embodiment, each demodulator/tuner and the mass data storage device are also connected to a respective port on the Ethernet switch; and 6. Centralized functionality in the BMG and use of Ethernet interfaces within a thin-client digital STBs that can reduce the complexity and cost of digital STBs.

EXAMPLES OF EMBODIMENTS

FIG. 1 is a schematic diagram of a preferred embodiment of the present invention. A BMG 100 includes a data switch 101 coupled to a tuner/demodulator 102 and a mass storage device 103. As used to describe embodiments of the present invention, the term "coupled" encompasses a direct connection, an indirect connection, or a combination thereof. Moreover, two devices that are coupled can engage in direct communications, in indirect communications, or a combination thereof. In an embodiment, the data switch 101 is an Ethernet switch, such as a 100Base-T Ethernet switch. In another embodiment, the data switch 101 is a router.

Tuner/demodulator 102 can be coupled to one or more of a plurality of multimedia transmission systems, where each multimedia transmission system transmits a plurality of transmission signals (e.g., audio, video, television, data, etc.). Examples of multimedia transmission systems include CATV, direct broadcast satellite TV, direct broadcast satellite radio, terrestrial broadcast TV, terrestrial broadcast radio, and so forth. Tuner/demodulator 102 can be coupled to a CATV system (e.g., a headend of a CATV system) via communications link 32 (e.g., a coaxial cable). A plurality of transmission signals from a direct broadcast satellite TV system including satellite 20 and satellite dish 21 can be received by tuner/demodulator 102 via communications link 22. Also, tuner/demodulator 102 can be coupled to a terrestrial broadcast TV system via transmitter 10, antenna 11, and communications link 12.

The plurality of transmission signals from the multimedia transmission systems can be transmitted over a plurality of information channels, such as, for example, frequency divided information channels, time divided information channels, code divided information channels, wave divided information channels, or dense wave divided information channels.

A tuner of tuner/demodulator 102 can select an information channel of the plurality of information channels and pass a transmission signal to a demodulator of tuner/demodulator 102. The demodulator of tuner/demodulator 102 can extract an information signal from the transmission signal. For example, a tuner can pass a transmission signal at a particular frequency to a demodulator, and the demodulator can extract the information signal from the transmission signal. In such an example, the transmission signal includes a carrier signal and an information signal. The information signal can be a discrete (i.e., singular) information signal or a multiplexed, composite information signal. For example, a multiplexed, composite information signal may contain a plurality of information signals where discrete information signals are time-division multiplexed, frequency-division multiplexed, and/or code-division multiplexed. Accordingly, tuner/demodulator 102 can include a plurality of tuners and/or demodulators to isolate an information signal that is multiply multiplexed (e.g., frequency-multiplexed and time-multiplexed).

The information signal can be an analog information signal or a digital information signal. When the information signal is an analog information signal, an analog-to-digital converter can convert the analog information signal to a digital information signal (e.g., a Motion Picture Experts Group 2 (MPEG-2) signal). In an embodiment, a BMG can support multiple MPEG2 encoding sessions (e.g., two or more MPEG2 encoding sessions) and handle overlay processing. An example of overlay processing is presenting MPEG2 or other digital information in a multiple layer format. In another embodiment, a service application running on a BMG system can support transparent layers such as, for example, overlaying a Web page on top of a TV program image used for interactive TV services.

Tuner/demodulator 102 can send an information signal to mass storage device 103. Mass storage device 103 can be a hard disk drive, a magnetic storage device, an optical storage device, a magneto-optical storage device, or a combination thereof. The mass storage device 103 can store a digital information signal for subsequent playback and allows the BMG 100 to provide playback control (e.g., play, pause, rewind, fast forward, frame advance, etc.) of multimedia content (e.g., broadcast programs, movies, music, etc.).

Data switch 101 can receive a digital information signal from mass storage device 103, another digital information signal from tuner/demodulator 102, or a plurality of digital information signals from mass storage device 103 and/or tuner/demodulator 102. In an embodiment, a BMG 100 includes a plurality of tuner/demodulators, each of which can provide a digital information signal to data switch 101. In an embodiment, data switch 101 receives each digital information signal via a respective, dedicated switch port. For example, when mass storage device is capable of concurrently sending four information signals to switch 101, switch 101 can include four dedicated switch ports, where each dedicated switch port receives one information signal via a dedicated communications path. Moreover, when BMG 100 includes three tuner/demodulators, each tuner/demodulator can be coupled to a respective switch port of three switch ports of switch 101 such that each switch port receives one information signal. In another embodiment, data switch 101 can include a switch port coupled to a shared bus, where the shared bus carries a plurality of information signals. For example, dependant upon the data bandwidth requirements of the information signals and the data bandwidth capabilities of the shared bus and the switch port, the switch port may be able to receive four concurrent information signals.

In an embodiment, data switch 101 can receive a digital multimedia information signal (e.g., audio, video text data, graphics, or a combination thereof) via broadband data link 2 and residential gateway 5. After receiving the digital information signal (e.g., from mass storage device 103, from tuner/demodulator 102), data switch 101 can send the digital information signal to one or more of a plurality of information appliances coupled to the switch 101. Examples of information appliances that can receive a digital information signal include a digital set top box 300, a television 40 (e.g., a television coupled to a digital set top box, a television including digital set top box functionality), a computer 50, an audio system 60, an electronic book device 70, an MP3 (MPEG Layer-3) player 80, an so on. Information appliances can be coupled to the data switch 101 via a high bandwidth (i.e., broadband) communication link 95, a wired lower bandwidth communications link 96, and/or a wireless lower bandwidth communications link 97. Examples of high bandwidth communications links 95 include CAT 5, CAT 5e, CAT 6, or CAT 7 twisted pair wiring. Additional examples of high bandwidth communications links 95 include coaxial cable, optical fiber cable (e.g., OC-3 cable), and so forth. Examples of a wired lower bandwidth communications links 96 include Home-PNA Version 2.0 compliant phoneline wiring coupled to a HomePNA port 141, CAT 3 twisted pair wiring, etc. Examples of wireless lower bandwidth communications links 97 include a HomeRF communications link (e.g., generated at least in part by a HomeRF transceiver 142), an IEEE 802.11 communications link (e.g., generated at least in part by an IEEE 802.11 transceiver 143), a Bluetooth communications link (e.g., generated by a Bluetooth transceiver 144), and so on.

In accordance with an embodiment of the present invention, multiple information appliances can receive a digital information signal from data switch 101. For example, a television program broadcast by a CATV system can be received by BMG 100, and BMG can send that television program to a plurality of televisions 40 and/or computer 50 such that a user at an information appliance views the television program in real-time. BMG 100 can also store that television program on mass storage device 103 so that a user can view the television program at a later time on one or more of the information appliances (e.g., televisions 40 and/or computer 50).

Data switch 101 can also allow one or more users to access a broadband data service including a broadband data link 2. Examples of a broadband data link 2 include an ADSL link, a fiber optic link, and so on. A residential gateway 5 can interface communications between the broadband data service and the BMG 100. Residential gateway 5, in an embodiment, includes an integrated ADSL modem, a router and a firewall. It can be Open Services Gateway initiative ("OSGi")-compliant. (See www.osgi.org for additional OSGi information). Data switch 101 can allow, for example, a user at computer 50 to access the World Wide Web (the "Web") while another user accesses the Web as part of a Web-enhanced television service at a television 40.

Figure 2:
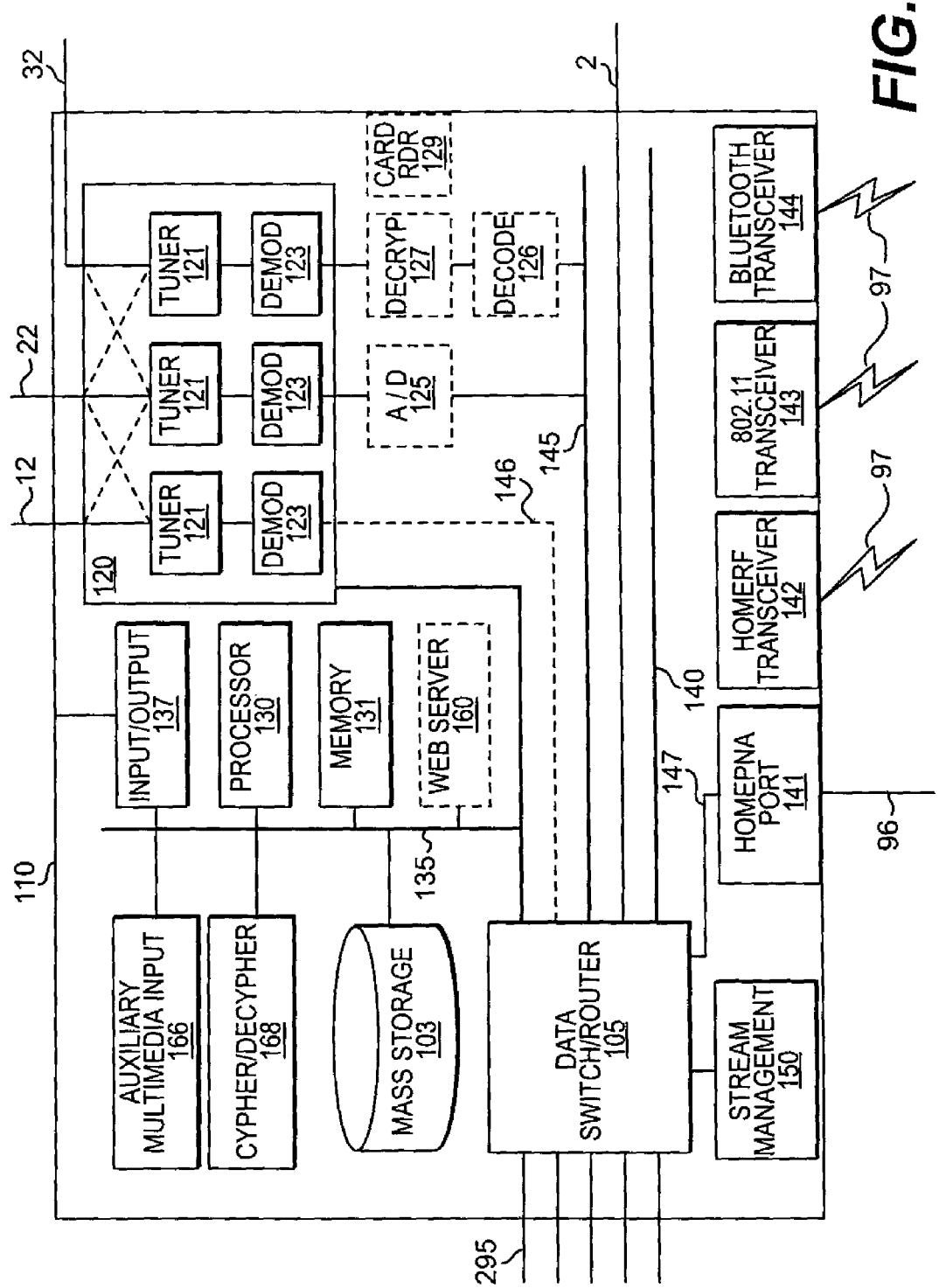
FIG. 2 is a schematic diagram showing a preferred embodiment of a broadband multimedia gateway.

FIG. 2 is a schematic diagram showing a preferred embodiment of a broadband multimedia gateway. BMG 110 can include mass storage device 103 coupled to a data switch/router 105. Data switch/router 105 can be a 100Base-T Ethernet switch, a 10/100Base-T Ethernet switch, a Gigabit Ethernet switch, an ATM router, and so forth. The data switch/router 105 can be coupled to signal processing circuit 120.

Signal processing circuit 120 can include a plurality of tuners 121 and a plurality of demodulators 123, where each demodulator 123 is coupled to a tuner 121. Each tuner can be coupled to one or more communications links, e.g., communications links 12, 22, and 32. When a communication link is coupled to a plurality of tuners 121, a plurality of information signals (e.g., television programs, movies, audio, songs, albums, etc.) broadcast over a communications link can be sent to data switch/router 105 and/or mass storage device 103 to allow real-time viewing and/or playback control (e.g., viewing, playing, recording, pausing, etc.) of multiple information signals. For example, a viewer at a first television may view a first CATV program, and another viewer at a second television may view a second CATV program. Further, a viewer can view a first CATV program while a second CATV program is recorded to the mass storage device.

In an embodiment, each tuner 121 is coupled to the Ethernet switch via a dedicated connection to the Ethernet switch (e.g., a first tuner 121 is coupled to a first switch port of data switch/router 105 via a dedicated communications link 146, a second tuner 121 is coupled to a second switch port of data switch/router 105 via another dedicated communication link). In another embodiment, each tuner 121 is coupled to data switch/router 105 via a shared communications link, such as shared Ethernet communications link 145, or a shared system bus 135. A shared system bus 135 can be coupled to signal processing circuit 120 for communications of control signals that can direct operation of tuners 121, demodulators 123, and other signal processing circuits and/or logic coupled to signal processing circuit 120. For example, control signals communicated to signal processing circuit 120 can include instructions to tune a tuner to a particular information channel to receive a transmission signal. In an embodiment, control signals can control the operation of an analog-to-digital converter 125 that can receive an analog information signal (e.g., an National Television Standards Committee (NTSC) TV signal) and output a digital information signal based at least in part on the analog information signal (e.g., an MPEG-2 digital information signal). The signal processing circuit 120 can also be coupled to a decryption circuit/logic 127 that can decrypt and/or unscramble an encrypted and/or scrambled information signal, and a decoder 126 that can convert a digital information signal from one digital format to a second digital format. In a further embodiment, the decryption circuit/logic 127 is coupled to a smartcard reader 129 to support CAS functionality.

An information signal (e.g., an audio-video signal from a DVD device, an audio signal from a Compact Disc (CD) device, an audio-video signal from a Video Cassette Recorder/Player (VCR), and so forth) can also be received by the BMG 110 via an auxiliary multimedia input 166, which can be coupled to the data switch/router 105 via system bus 135, via an Ethernet communications link, etc. In an embodiment, information signals can be encrypted and/or decrypted by cipher/decipher logic 168. Cipher/decipher logic 168 can decrypt and/or encrypt information signals according to encryption/copy protection protocols such as an Analog CPS (Copy Protection System) (e.g., a Macrovision protocol), CGMS (Copy Guard Management System), CSS (Content Scrambling System), CPPM (Content Protection for Prerecorded Media), CPRM (Content Protection for Recordable Media), DCPS (Digital Copy Protection System), DTCP (Digital Transmission Content Protection), and so forth. An information signal received from the auxiliary multimedia input 166 can be stored—either encrypted or unencrypted—on the mass storage device 103 and/or sent to one or more information appliances coupled to data switch/router 105.

In a preferred embodiment, BMG 110 includes a processor 130 and a memory 131, each coupled system bus 135. Processor 130 can be, for example, an Intel Pentium® III processor, manufactured by Intel Corp. of Santa Clara, Calif. As another example, processor 130 can be an Application Specific Integrated Circuit (ASIC). Memory 131 may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof Memory 131 of BMG 110 can store a plurality of instructions to control the operations of BMG 110, such as program recording, program playback, pay-per-view, and so forth. In an embodiment, the operations of BMG 110 can be controlled at least in part via a Web browser-based graphical user interface (GUI) displayed to a user (e.g., displayed on a television). In an embodiment, memory 131 can store Web-server instructions such as GUI instructions to provide a Web browser-based GUI to a user, BMG operation program instructions, pay-per-view management program instructions, and other instructions related to control and operation of the BMG 110. Web-server instructions can also provide Web-enhanced television to televisions coupled to data switch/router 105. In another embodiment, the BMG 110 includes a Web-server 160 to provide a Web browser-based GUI to a user for control and operational purposes.

Information appliances can be coupled to data switch/router 105 via dedicated high bandwidth Ethernet communications links 295, each of which can be coupled to a respective switch port of data switch/router 105. In an embodiment, each of Ethernet communications links 295 is a CAT 5 or better cable. High bandwidth Ethernet communications links 295 can carry high bandwidth information signals (e.g., digital TV signals, MPEG-2 information signals, HDTV signals, and other audio-video signals). Lower bandwidth information signals (e.g., audio, text, and so forth) can be communicated over lower bandwidth communications links, which can be a dedicated lower bandwidth communication link 147 or a shared lower bandwidth communication link 140.

Stream management logic and/or circuitry 150 can be coupled to data switch/router 105. In an embodiment, the stream management 150 can include a port router, a multiplexer, and overlay processing logic. The port router can preserve quality of service (QOS) delivery between end points in the home network (e.g., between TVs and the Digital Residential Entertainment System). The router ensures that the only digital signal sent on the unique network segment pertains to the established session between the designated end point devices. The multiplexer, in an embodiment, can synchronize multimedia of different source types such as TV programming and advertising material. For example, pertinent content can be synchronized based on the requirements of the service offering. The synchronized content can then sent over the internal bus structure of Digital Residential Entertainment System to the overlay processor. The overlay processing logic can support superimposing one or more information signals (e.g., a second audio-video signal, a computer graphics signal) over a first information signal (e.g., a first audio-video signal). Web-enhanced television and picture-in-a-picture (PiP) functionality can utilize the overlay processing logic.

BMG 110 can also include input/output logic and devices 137. For example, input/output 137 can include one or more test ports such as a keyboard input, a mouse input, a Universal Serial Bus (USB) input, a Video Graphics Array (VGA) output. Peripherals (e.g., a keyboard, a mouse, a video monitor) can be coupled to the test ports to assist with set-up, repair, maintenance and/or upgrading of BMG 110. Input/output 137 can also include a USB port that can be coupled to a printer, a recordable media device (e.g., a Rewritable CD-ROM drive ("CD-RW"), a Rewritable DVD drive ("DVD-RAM"), a flash memory device, and so on), and so on. For example, printouts such as program settings, system configurations, and service charges can be printed via a USB port. Information programs (e.g., television shows, movies, songs, multimedia, and so forth) can be archived and/or copied to removable media (e.g., DVD, CD-ROM) to free up space on mass storage device 103 or provide for a portable version (e.g., a gift DVD, a CD-ROM for a car audio player, etc.). Input/output 137 can also include a smart card reader/writer that can in part control access to pay-per-view services, limit access to types of programs or channels, and support debug operations. Smart cards are typically a credit card-sized card that contain a microprocessor, memory, and a battery. They can store electronic keys, user profiles, user identifiers, access rights, financial information, and other data. Debug operations can be integrated as a base operation in the system service applications. Only authorized and ultimately authenticated smart cards inserted into the entertainment system (e.g., into card reader 129, coupled to input/output 137) can open locally accessible debug operations. "Consumer" smart cards are authorized for services designed and developed for entertainment content delivery. Thus, an embodiment of the present invention has real-time pay-per-view and multimedia delivery support. In a further embodiment, pay-per-view events can be authorized at least in part with a CAS smartcard device.

Figure 3:
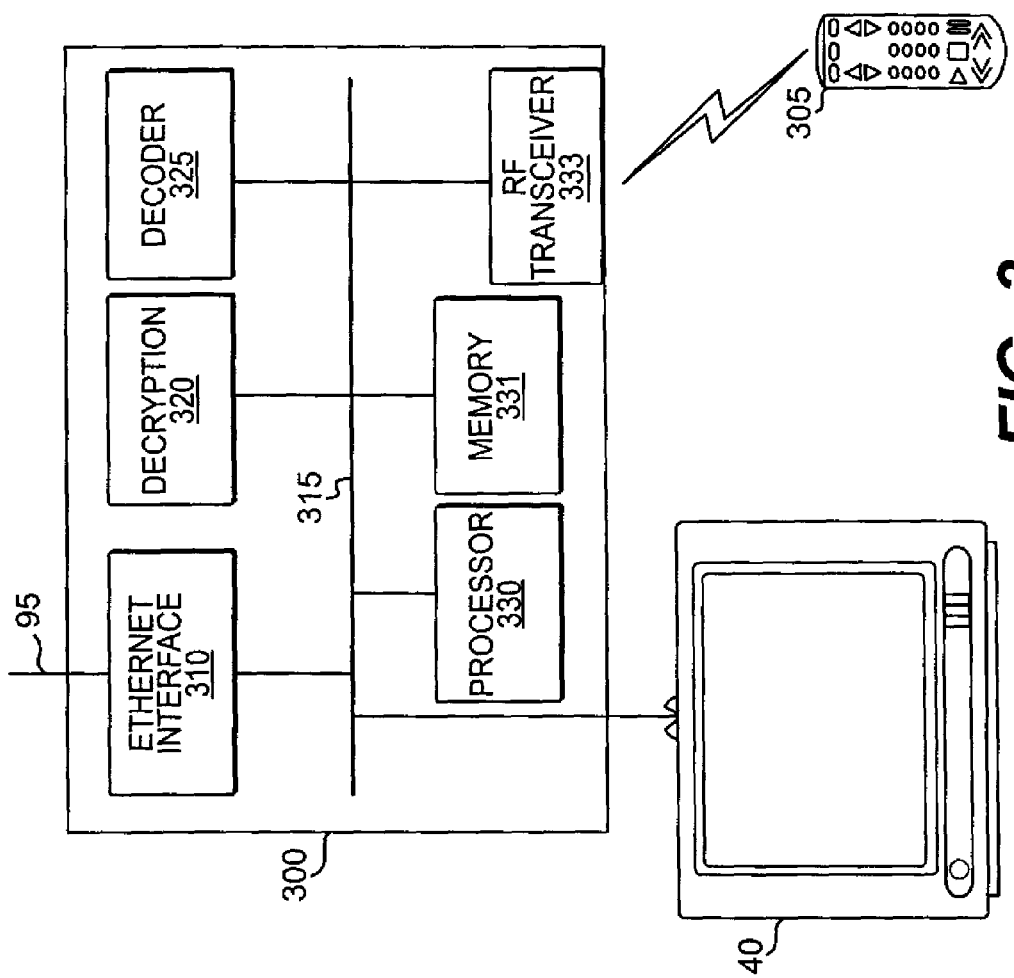
FIG. 3 is an illustration of a thin-client digital set top box according to a preferred embodiment of the present invention.

FIG. 3 is an illustration of a thin-client digital set top box according to a preferred embodiment of the present invention. Thin-client digital set top box (TC DSTP) 300 can be coupled to a switch port of a data switch (e.g., a switch port of an Ethernet switch) via a dedicated high bandwidth communications link 95. In another embodiment, a plurality of TC DSTPs 300 and a data switch can be coupled via a shared high bandwidth communications link. TC DSTP 300 receives a digital information signal from the data switch and can output an audio and/or video signal to television 40. Television 40 can include a video display that displays video based at least in part on the video signal and audio components (e.g., speakers) that output audio based at least in part on the audio signal. The audio signal can also be received by an audio system (e.g., a home theater system) that produces audio of a better quality than the speakers of a typical television.

TC DSTB 300 can include an Ethernet interface 310 when coupled to a BMG including an Ethernet switch. When TC DSTB 300 is coupled to a BMG having a different type of data switch supporting a different communications protocol (e.g., an ATM router), the TC DSTB 300 can include a data switch interface compatible with that different type of data switch. TC DSTB 300 can receive a digital information signal from the data switch and process the digital information signal for output as an audio and/or video signal. For example, TC DSTB 300 can include decryption logic 320 coupled to the Ethernet interface 310 via a bus 315, and the decryption logic 320 can decrypt digital information signals that are sent by the data switch in an encrypted and/or protected format. Decoder logic 325 can also be included in TC DSTB 300 to convert a digital information signal from a first digital format (e.g., a transmission format, a compressed format) to a second digital format (e.g., a display format).

Operation of the TC DSTB 300 can be controlled at least in part by processor 330 and memory 331. An RF transceiver 333 of TC DSTB 300 can receive from a remote control 305 remote data (e.g., remote control instructions, remote control data) relating to operation and control of TC DSTB 300, such as instructions relating to playback control of information signals sent to TC DSTB 300 and television 40. Remote control 305 can select programs to be displayed that are being transmitted by a CATV system, a DBS TV system, a terrestrial TV system. Playback control commands can be sent by remote control 305 to control playback of programs stored on mass storage device 103. In an embodiment, remote control 305 can include keyboard and pointer functionality to facilitate Web surfing and/or Web-enhanced television.

In an embodiment, TC DSTB 300 controls the display of a Web browser-based GUI ("WBB GUI") on television 40. The WBB GUI can provide an interface for accessing multimedia applications and content, and the TC DSTB 300 can control the display of the WBB GUI based at least in part on user input received via remote 305 and program instructions and data stored in TC DSTB 300 and/or a BMG coupled to the TC DSTB 300. For example, applications that can be executed based on the WBB GUI and the remote 305 include a broadcast program guide; broadcast TV viewing control; broadcast audio listening control; movies-on-demand; audio-on-demand; recording, storage and playback of broadcast programs; interactive TV; Web-enhanced TV; e-mail communications; Web surfing; electronic surfing; and so forth.

Figure 6:
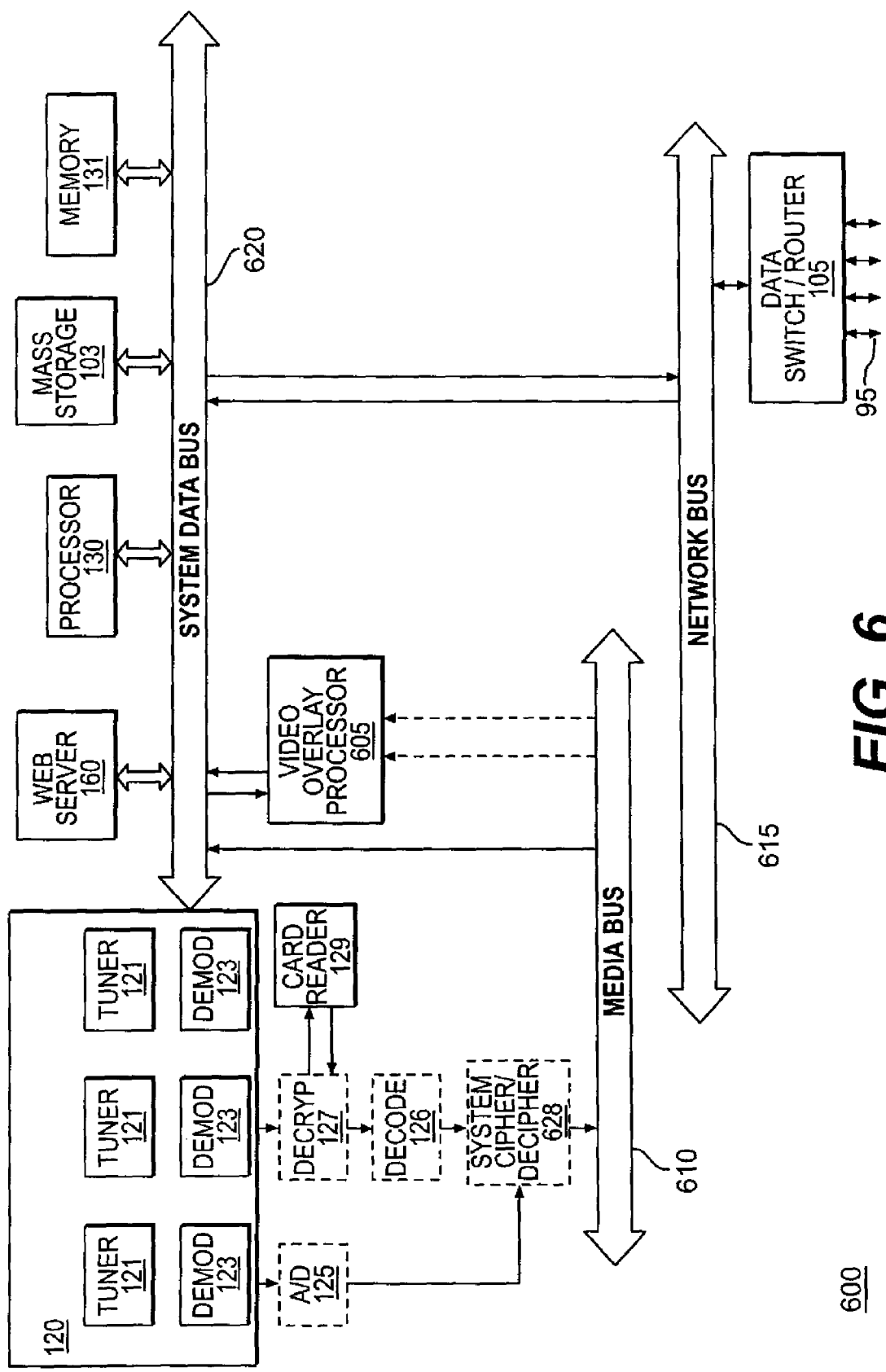
FIG. 6 illustrates another embodiment of the present invention.

FIG. 6 illustrates another embodiment of the present invention. A BMG 600 can include a plurality of buses to interconnect BMG components. For example, the plurality of buses can include a media bus 610, a network bus 615, and a system data bus 620. Media bus 610 can receive information signals (e.g., broadcast signals, multimedia signals, and so on) from signal processing circuit 120. In an embodiment, signal processing circuit 120 and media bus 610 are coupled via system cipher/decipher logic 628. System data bus 620 can be coupled to the media bus 610 to receive information signals (e.g., for storage on mass storage device 103, for sending to information appliances, and so on). In an embodiment, media bus 610 and system data bus 620 can be coupled to a video overlay processor 605 to support at least in part picture-in-picture operations, picture-in-graphic operations, and other video overlay operations. System data bus 620 can be coupled to data switch/router 105 via network bus 615 to receive information signals (e.g., real-time information signals), overlayed information signals and stored information signals (e.g., stored on mass storage device 103). Data switch/router 105 can be coupled to a plurality of high bandwidth communications links 95 for transmission of information signals to information appliances.

Figure 4:
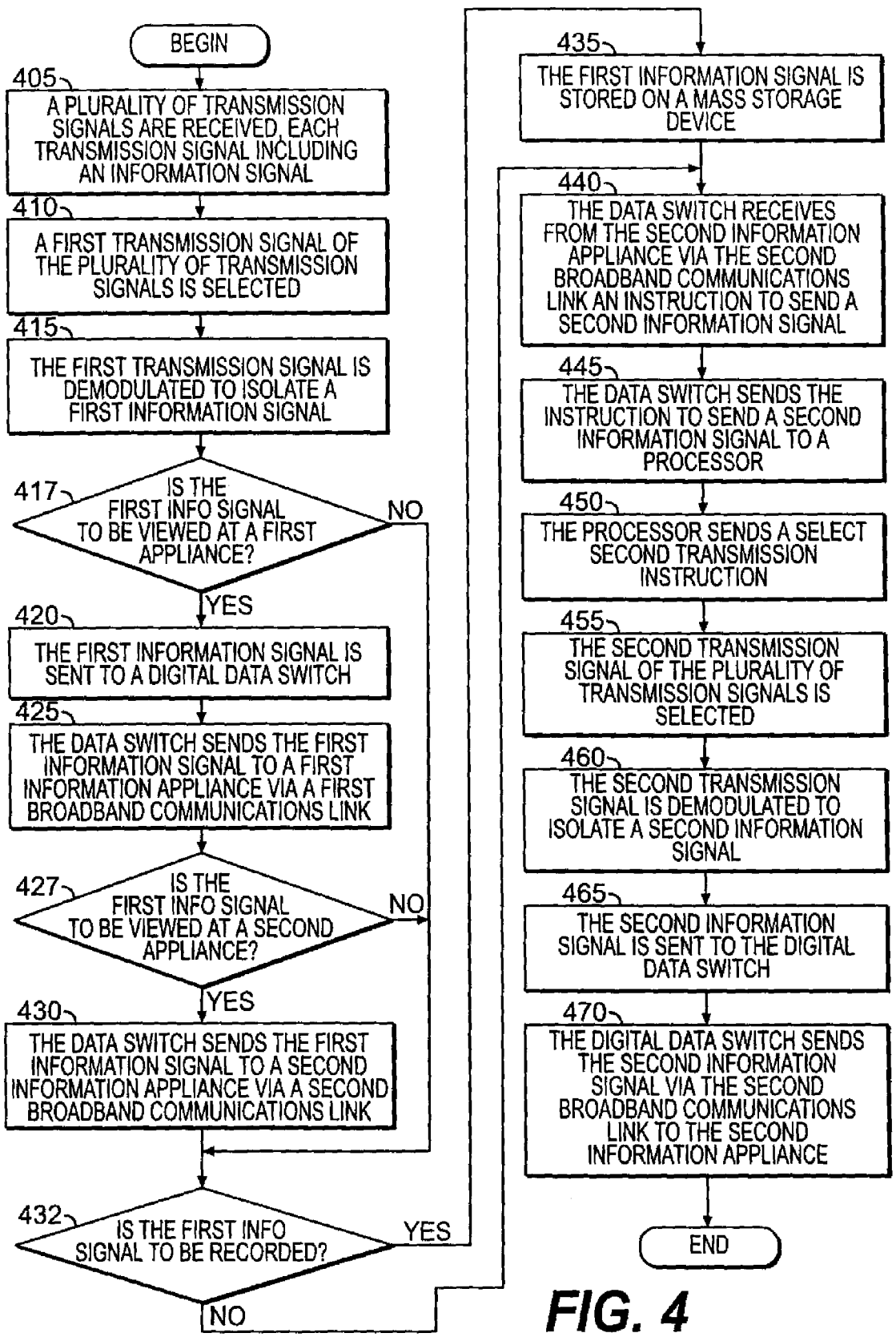
FIG. 4 shows an illustration of an embodiment of the present invention.

FIG. 4 shows an illustration of an embodiment of the present invention. A plurality of transmission signals are received (e.g., by a multichannel tuner), and each transmission signal includes an information signal (box 405). A first transmission signal of the plurality of transmission signals is selected (e.g., by the multichannel tuner) (box 410), and demodulated to isolate a first information signal (box 415). Whether the first information signal is to be viewed at a first information appliance is determined (box 417). When the first information signal is to be viewed at a first information appliance, the first information signal is sent to a digital data switch (box 420), and the digital data switch can send the first information signal to the first information appliance via a first broadband communications link coupled to the digital data switch (box 425).

Whether the first information signal is to be viewed at a second information appliance is determined (box 427). When the first information signal is to be viewed at a second information appliance, the digital data switch can send the first information signal to the second information appliance via a second broadband communications link coupled to the digital data switch (box 430). Whether the first information signal is to be record (e.g., for later playback, for playback control, to provide personal video recording ("PVR") functionality, and so on) is determined (box 432). When the first information signal is to be recorded, it can be stored on a mass storage device (box 435).

In an embodiment, the first information signal is sent to the mass storage device via the digital data switch. In another embodiment, the first information signal is sent to the digital data switch via the mass storage device. In a further embodiment, the first information signal is sent to both the mass storage device and the digital data switch contemporaneously (e.g., in parallel, in serial).

The digital data switch receives an instruction to send a second information signal from the second information appliance via the second broadband communications link (box 440), and sends the instruction to send a second information signal to a processor (box 445). The processor sends a select second transmission instruction (e.g., to the multichannel tuner) (box 450). The second transmission signal of the plurality of transmission signals is selected (e.g., by the multichannel tuner) (box 455), and demodulated to isolate a second information signal (box 460). The second information signal is sent to the digital data switch (box 465), and the digital data switch sends the second information signal to the second information appliance via the second broadband communications link (box 470).

In accordance with an embodiment of the present invention, a service provider can download multimedia content items (e.g., movies, television programs, songs, albums, and so forth) to a multimedia-on-demand device ("MODD") including a mass storage device that can store received multimedia content. In an embodiment, a MODD can be part of a BMG that includes a plurality of tuner/demodulators and a data switch. Multimedia content downloading can be accomplished using a broadband data service, such as ADSL, a satellite direct multicast/broadcast service, a cable television service, a digital cable television service, a terrestrially broadcast television service, a wireless broadband data service, a wired broadband data service, and so on. Downloaded multimedia content items are stored on the mass storage device of the MODD. Each stored multimedia content item can be identified by a multimedia content item identifier, and use of the multimedia content item (e.g., playback, purchase of a copy, licensing of a copy, etc.) can be indicated by a multimedia content item usage indicator. Usage of the multimedia content item can be reported to the multimedia-on-demand service provider ("MODSP") by transmitting a usage message to the MODSP. For example, a usage message can be based at least in part on the multimedia content item usage indicator and report that a subscriber viewed a movie, listened to a song, copied an album to non-volatile medium (e.g., a recordable CD-ROM, a recordable DVD).

A MODD, in an embodiment, can automatically receive multimedia content items from a MODSP, where the MODSP downloads a plurality of multimedia content items without a user selecting or requesting the downloading of a particular multimedia content item. In an embodiment in which a MODSP offers a pay-per-view movie service, a user can opt to receive the pay-per-view service (e.g., subscribe to the service) or may receive the pay-per-view service because it is a system default service that each user receives as part of using the system (e.g., it is a bundled component of a digital cable service, a direct broadcast satellite television service, and so on). But the user need not select or direct the downloading of an individual multimedia content item. The MODSP can, however, automatically send the plurality of multimedia content items based on a subscriber profile or a system profile, and the user can modify or update such profiles (e.g., to select a particular genre of movies, music, content, and so on).

For example, in an embodiment in which a MODSP offers a pay-per-view service, the MODSP can automatically download each of the top ten movie rentals for a given week to a MODD of a user. Aside from perhaps subscribing to such a "Top Ten Movies" service, a user need not individually indicate or order that one of the "Top Ten Movies" be downloaded. To access the automatically downloaded content, the user can instruct the MODD to display a listing of the "Top Ten Movies" that are stored on the mass storage device of the MODD and select one for playback. The MODSP can update the "Top Ten Movies" by downloading a new movie to the MODD to replace one of the previously stored movies (e.g., by indicating that one of the previously stored movies is to be deleted, by storing the new movie in the storage position of one of the previously stored movies, by updating a data table that indexes the stored movies, etc.).

In another embodiment, a MODSP can automatically download each of the top 40 singles or albums of a particular music genre. The top 40 lineup can be updated daily, weekly, monthly, or at another desired time interval. A user can modify a subscriber profile to identify the genre of multimedia content items that are to be automatically downloaded (e.g., county & western music, action movies, pop singles, new releases, etc.). A MODD can store the downloaded multimedia content items on a mass storage device. It can include a data table to indicate which multimedia content items are locally stored and the usage status of each of the multimedia content items.

For example, FIG. 5 shows a data table in accordance with an embodiment of the present invention. A MODD can include a data table 500 (e.g., stored on a mass storage device, stored in non-volatile memory, etc.) Data table 500 can include a plurality of data records 501. Each data record 501 can correspond to a multimedia content item stored on the mass storage device. In an embodiment, each data record 501 of data table 500 includes a multimedia content item identifier field 505 to store a multimedia content item identifier (e.g., a movie title, a movie identification code, a movie filename, a song title, an album title, and so on), and a multimedia content item type indicator field 510 to store a multimedia content item type indicator (e.g., audio-video, audio, television program, movie, animation, presentation, graphics, text, etc.)

Data record 501, in an embodiment, can include multimedia content item usage indicator fields 520 and 530 that can each store an indicator as to whether the corresponding multimedia content item has been used. For example, multimedia content item usage indicator field 520 can store an indication regarding whether the corresponding multimedia content item has been played (e.g., played for viewing, played for listening), and multimedia content item usage indicator field 530 can store an indication as to whether the corresponding multimedia content item has been purchased (e.g., copied to a portable non-volatile storage medium such as a recordable CD-ROM or DVD, sent to an information appliance that can store the multimedia content item, changed from a temporary file to a permanent file resident on the mass storage device, copied to a separate mass storage device for archival purposes, etc.). In another embodiment, a multimedia content item usage indicator field can store one or more multimedia content item usage indicators corresponding to the multimedia content item (e.g., an indicator that the item has not been played or purchased, that the item was purchased, that the item was licensed, and so forth). In an embodiment, the cost of playback and/or purchase can vary based on the particular multimedia content item, and cost fields 515 and 525 can respectively store the cost of playback (e.g., cost of viewing, cost of listening) and cost of purchase (e.g., cost of ownership, cost of a type of license, and so on).

In an embodiment, a MODD can be part of a BMG that includes a data switch and is coupled to a plurality of information appliances via a plurality of broadband data links. A user at an information appliance of the plurality of information appliances can use a wireless infrared or RF remote control to access a BMG-generated Web page to determine what multimedia content items are currently stored on the MODD/BMG. After the consumer sends a usage instruction (e.g., playback instruction), the MODD/BMG can direct usage of the multimedia content item (e.g., begin streaming the selected multimedia content item to the information appliance). Usage information relating to the selected multimedia content item can be written to a data table 500. Periodically, data table 500 can be used to generate a usage message that is sent to the MODSP for customer billing purposes, customer monitoring purposes, account processing, etc. For example, the usage message can be sent each evening in the middle of the night via a dial-up data connection, after each modification of the data table via a dedicated data connection, and so forth. In an embodiment in which the MODD/BMG is coupled to an always on data service, a usage message can be automatically sent immediately following a user purchase.

In an embodiment of the present invention, multimedia content items are sent to a MODD at a transmission rate that is different than the playback rate of the multimedia content item. Known pay-per-view services transmit television programs (e.g., movies, sporting events, etc.) at a real-time rate where the rate of playback is the same as the transmission rate. Embodiments of the present invention advantageously provide for transmission of multimedia content items at rates that are lesser and greater than a playback rate because the multimedia content items are to be stored on a mass storage device. For example, multimedia content items can be automatically downloaded at high speed during a period of the day when a data network typically has fewer data demands (e.g., in the middle of the night). Also, multimedia content items can be automatically downloaded at lower speeds (e.g., at one-quarter of the playback rate, at one-tenth of the playback rate, at one-fiftieth of the playback rate) based on network data demands, or network bandwidth constraints.

For example, a 120 minute movie at an MPEG2 encoded rate of 3.5 Mb/s can comprise a 3.15 gigabyte data file, and known ADSL services can provide down stream data transmission rates of 1.5 Mbps. Downloading the 120 minute movie over such an ADSL line can take approximately 4.7 hours, and the downloading of the 120 minute to a MODD can be automatically performed in the middle of the night. Subsequently, a user can request that the movie be played back to an information appliance at the playback rate (e.g., real-time).

In another embodiment of the present invention, the MODD can indicate that a multimedia content item is available for playback prior to storing the entirety of the multimedia content item. For example, a multimedia content item can have a 2 hour playback time and comprise a 2 gigabyte data file. When the MODD receives the movie at an average transmission rate of, for example, 444 kbps, it can require approximately 10 hours total to receive the entirety of the multimedia content item. When playback rate of the multimedia content item is relatively smooth and the remaining amount of time required to complete the download is less than the playback time of the multimedia content item, the MODD can indicate that the multimedia content item is available for playback. Thus, when the downloading of the multimedia content item began at noon, for example, and would not be complete until 10:00 p.m., the MODD can nevertheless indicate that the multimedia content item is available for playback beginning at 8:00 p.m.

A MODSP, in an embodiment of the present invention, can access a subscriber profile to determine which particular multimedia content items are to be automatically downloaded to a MODD. In an embodiment, a subscriber profile is a system default profile where each subscriber receives the same content. In another embodiment, a subscriber profile allows a subscriber to specify the types of multimedia content items that will be automatically downloaded to a MODD of the subscriber. For example, a subscriber can indicate that he would like to have the top ten movie rentals downloaded and stored on his MODD. Each time that top ten movie lineup changes (e.g., daily, weekly, biweekly, monthly, etc), the new movies can be automatically downloaded to the MODD and the movies that are no longer in the top ten movie lineup can be removed (e.g., deleted, overwritten, de-indexed, etc.) from the MODD.

In an embodiment, a MODSP automatically sends a multimedia content item identifier with each multimedia content item that is sent to the MODD. The MODD can then store the multimedia content item on a mass storage device and the multimedia content identifier in a data table that can track usage, if any, of the multimedia content item.

A MODSP can also send a multimedia content item storage position identifier for each multimedia content item. The multimedia content item storage position identifier can specify a logical storage position for a multimedia content item. For example, in a top five movies-on-demand service, the multimedia content item storage position identifier can specify whether a particular movie is number 1, number 3, number 5, and so forth. When the movie lineup changes (e.g., the rankings of the movies are reordered), new multimedia content item storage position identifiers can be downloaded for the multimedia content items already stored on the MODD.

For example, Table 1 shows a top five movie lineup, where each of movies A, C, R, E, and S are stored on a MODD.

TABLE 1

| Storage Position Identifier | Multimedia Content Item Identifier |
|---|---|
| 1 | Movie A |
| 2 | Movie C |
| 3 | Movie R |
| 4 | Movie E |
| 5 | Movie S |

Table 2 shows that when the movie lineup changes (as compared to Table 1) without the addition of any new movie, the storage position identifiers can be updated (e.g., via downloading).

TABLE 2

| Storage Position Identifier | Multimedia Content Item Identifier |
|---|---|
| 1 | Movie S |
| 2 | Movie C |
| 3 | Movie A |
| 4 | Movie R |
| 5 | Movie E |

Table 3 shows that when the movie lineup changes (as compared to Table 2) with the addition of one or more new movies: a new multimedia content item can be automatically downloaded with a multimedia content identifier and a multimedia content item storage position identifiers; and/or an old multimedia content item can be removed (e.g., overwritten, deleted, evicted from an index, etc.).

TABLE 3

| Storage Position Identifier | Multimedia Content Item Identifier |
|---|---|
| 1 | Movie S |
| 2 | Movie C |
| 3 | Movie A |
| 4 | Movie R |
| 5 | Movie F |

In an embodiment, a multimedia content item identifier is a composite multimedia content item identifier/multimedia content item storage position identifier. In another embodiment, a plurality of multimedia-on-demand services are supported by a MODD. For example, a MODD stores a plurality of movies-on-demand lineups (e.g., top action movies, top comedy movies) and a plurality of audio-on-demand lineups (e.g., top alternative albums, top country albums, top 40 singles), and the multimedia content item storage position identifiers can be coded to identify a particular multimedia-on-demand lineup (e.g., MA1, MA2, MA3 correspond to three movies of a first movie lineup, MB1, MB2, MB3, correspond to three movies of a second movie lineup).

In accordance with an embodiment of the present invention, instructions adapted to be executed by a processor to perform a method are stored on a computer-readable medium. The computer-readable medium can be a device that stores digital information. For example, a computer-readable medium includes a CD-ROM as is known in the art for storing software. The computer-readable medium is accessed by a processor suitable for executing instructions adapted to be executed. The terms "adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

In an embodiment of the present invention, a user at any appliance through a Web-based graphical user interface can instruct the processor to record any broadcast program onto mass storage for subsequent viewing and/or listening from a multiplicity of appliances. The user can choose to have the broadcast program recorded once or every time that the program is broadcast.

Systems and methods in accordance with the embodiments of the present invention disclosed herein can advantageously provide a digital residential entertainment system. In an embodiment, a digital residential entertainment system can provide access to multimedia content over an in-house broadband data network that is coupled to a data switch, a mass storage device and a variety of information appliances. The broadband data network can include Category 5 or better twisted pair wiring that can support the distribution of broadcast video, multimedia-on-demand services, broadcast audio, Web surfing, and other multimedia applications and services. In an embodiment of the present invention, multimedia-on-demand services can be provided by automatic downloading of multimedia content items to a mass storage device. A user can select usage (e.g., playing, purchasing) of the locally-stored multimedia content items, and that usage can be reported to the multimedia-on-demand service provider.

Embodiments of systems and methods for multimedia-on-demand services have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

The invention claimed is:

1. A system, comprising:
a video overlay processor connected between a system data bus and a media bus, the video overlay processor having three inputs and an output, a first input connected to the media bus, a second input connected to the media bus, and a third input connected to the system data bus, the video overlay processor superimposing a first audio-visual signal over a second audio-visual signal to produce a superimposed signal, the output of the video overlay processor sending the superimposed signal over a connection to the system data bus;
a network bus having a single input connected to the system data bus and receiving the superimposed signal; and
a data switch connected to the network bus, the data switch receiving the superimposed signal and sending the superimposed signal to a switch port of the data switch.

2. The system according to claim 1, further comprising a tuner and demodulator pair having an output connected to the system data bus.

3. The system according to claim 2, further comprising an analog-to-digital converter receiving an analog information signal from the tuner and demodulator pair, and the analog-to-digital converter outputting a digital signal based at least in part on the analog information signal.

4. The system according to claim 2, further comprising a decryption circuit connected to the tuner and demodulator pair, the decryption circuit decrypting an encrypted information signal received from the tuner and demodulator pair and producing a decrypted information signal.

5. The system according to claim 4, further comprising a decoder circuit connected to the decryption circuit that converts the decrypted information signal from a first format to a second format.

6. The system according to claim 5, further comprising a cipher/decipher circuit connected to the decoder circuit and to the media bus to decipher the decrypted information signal converted from the decoder circuit.

7. The system according to claim 1, further comprising a mass storage device connected to the system data bus and storing information received from the system data bus.

8. The system according to claim 1, further comprising memory connected to the system data bus.

9. A method, comprising:
connecting a video overlay processor between a system data bus and a media bus, connecting a first input of the video overlay processor to the system data bus, connecting a second input of the video overlay processor to a first output of the media bus, connecting a third input of the video overlay processor to a second output of the media bus;
superimposing a first audio-visual signal over a second audio-visual signal by the video overlay processor to produce a superimposed signal;
connecting an output of the video overlay processor to the system data bus and sending the superimposed signal to the system data bus;
connecting an input of a network bus to the system data bus to receive the superimposed signal;
connecting a port of a data switch to the network bus; and
receiving the superimposed signal at the port of the data switch.

10. The method according to claim 9, further comprising connecting an output of a tuner and demodulator pair to the system data bus.

11. The method according to claim 10, further comprising connecting an analog-to-digital converter to the tuner and demodulator pair and receiving an analog information signal from the tuner and demodulator pair, and outputting a digital signal from the analog-to-digital converter based at least in part on the analog information signal.

12. The method according to claim 11, further comprising connecting a decryption circuit to the tuner and demodulator pair to decrypt an encrypted information signal received from the tuner and demodulator pair and to produce a decrypted information signal.

13. The method according to claim 12, further comprising connecting a decoder circuit to the decryption circuit to convert the decrypted information signal from a first format to a second format.

14. The method according to claim 13, further comprising connecting a cipher/decipher circuit to the decoder circuit and to the media bus to decipher the decrypted information signal converted from the decoder circuit.

15. The method according to claim 9, further comprising connecting a mass storage device to the system data bus and storing information received from the system data bus.

16. The method according to claim 9, further comprising connecting memory to the system data bus.

17. A system comprising:
multiple pairs of a tuner and a demodulator with each pair receiving a plurality of information signals;
a media bus having a first media bus input that receives the plurality of information signals from the multiple pairs of the tuner and the demodulator, the media bus having three media bus outputs, with a first media bus output connected to a system data bus;
a video overlay processor connected between the media bus and the system data bus, the video overlay processor having three video overlay processor inputs and a video overlay processor output, a first video overlay processor input connected to a second media bus output of the media bus, a second video overlay processor input connected to a third media bus output of the media bus, and a third video overlay processor input connected to the system data bus, the video overlay processor output connected to the system data bus, the video overlay processor receiving the plurality of information signals from the media bus and superimposing a first audio-visual signal over a second audio-visual signal to produce a superimposed signal and outputting the superimposed signal over the video overlay processor output to the system data bus;
a network bus having a network bus input connected to the system data bus and receiving the superimposed signal; and
a data switch connected to the network bus that receives the superimposed signal and that sends the superimposed signal to a switch port.

18. The system according to claim 17, further comprising a connection between an output of a tuner and demodulator pair to the system data bus.

19. The system according to claim 18, further an analog-to-digital converter having an input connected to the tuner and demodulator pair and receiving an analog information signal from the tuner and demodulator pair, the analog-to-digital converter having an output connected to the media bus, the analog-to-digital converter outputting a digital signal based at least in part on the analog information signal.

20. The system according to claim 19, further comprising a decryption circuit having an input connected to the tuner and demodulator pair to decrypt an encrypted information signal received from the tuner and demodulator pair and to produce a decrypted information signal.

\* \* \* \* \*